US012066556B2

(12) United States Patent
Pesce et al.

(10) Patent No.: US 12,066,556 B2
(45) Date of Patent: Aug. 20, 2024

(54) ADJUSTABLE BEARING SUPPORTS FOR SINGLE-AXIS TRACKERS

(71) Applicant: Ojjo, Inc., San Rafael, CA (US)

(72) Inventors: Katie Pesce, El Cerrito, CA (US); Charles Almy, Berkeley, CA (US); Greg McPheeters, Santa Cruz, CA (US); Tyrus Hudson, Petaluma, CA (US); Jack West, San Rafael, CA (US)

(73) Assignee: Ojjo, Inc., San Rafael, CA (US)

( * ) Notice: Subject to any disclaimer, the term of this patent is extended or adjusted under 35 U.S.C. 154(b) by 0 days.

(21) Appl. No.: 17/946,953

(22) Filed: Sep. 16, 2022

(65) Prior Publication Data

US 2023/0013785 A1    Jan. 19, 2023

Related U.S. Application Data

(63) Continuation of application No. 17/084,355, filed on Oct. 29, 2020, now Pat. No. 11,480,643.

(60) Provisional application No. 63/094,577, filed on Oct. 21, 2020, provisional application No. 62/927,515, filed on Oct. 29, 2019.

(51) Int. Cl.
*G01S 3/786* (2006.01)
*F16M 11/12* (2006.01)
*H02S 20/32* (2014.01)

(52) U.S. Cl.
CPC .......... *G01S 3/7861* (2013.01); *F16M 11/12* (2013.01); *F16M 2200/041* (2013.01); *H02S 20/32* (2014.12)

(58) Field of Classification Search
CPC .. G01S 3/7861; F16M 11/12; F16M 2200/04; F16M 2200/041; H02S 20/32; F24S 25/70; F24S 25/65; Y02E 10/47
See application file for complete search history.

(56) References Cited

U.S. PATENT DOCUMENTS

| 5,125,613 | A  | * | 6/1992 | Albee, Jr. | ............... | A47B 97/08 |
|---|---|---|---|---|---|---|
|  |  |  |  |  |  | 248/463 |
| 8,459,249 | B2 | * | 6/2013 | Corio | .................... | F24S 30/425 |
|  |  |  |  |  |  | 126/606 |
| 2014/0216522 | A1 | * | 8/2014 | Au | ......................... | H02S 20/32 |
|  |  |  |  |  |  | 136/246 |
| 2015/0059826 | A1 | * | 3/2015 | Reed | ........................ | F24S 25/00 |
|  |  |  |  |  |  | 136/246 |
| 2015/0207452 | A1 | * | 7/2015 | Werner | .................. | F24S 30/425 |
|  |  |  |  |  |  | 136/246 |
| 2016/0218663 | A1 | * | 7/2016 | Werner | .................. | F24S 30/425 |
| 2018/0051915 | A1 | * | 2/2018 | Rainer | ..................... | F24S 25/10 |
| 2018/0224161 | A1 | * | 8/2018 | Au | ............................ | F24S 25/65 |
| 2019/0212410 | A1 | * | 7/2019 | Au | ........................... | H02S 20/32 |

(Continued)

FOREIGN PATENT DOCUMENTS

EP        1795829 A2 *  6/2007  ............. F24J 2/5424

*Primary Examiner* — Terrell L McKinnon
*Assistant Examiner* — Ding Y Tan
(74) *Attorney, Agent, or Firm* — Phillip D Mancini

(57) ABSTRACT

Adjustable bearing supports for single-axis trackers supported by truss foundations. A two-piece assembly joins a pair of adjacent truss legs to form a rigid foundation while providing a movable support for a tracker bearing housing assembly or other structure. The movable support may slide in-plane, or alternatively, enable the bearing housing assembly to slide and rotate with respect to the truss cap structure joining the adjacent truss legs.

7 Claims, 11 Drawing Sheets

(56) References Cited

U.S. PATENT DOCUMENTS

| | | | |
|---|---|---|---|
| 2020/0052643 A1* | 2/2020 | Ballentine | F16M 11/10 |
| 2020/0076354 A1* | 3/2020 | West | F24S 25/13 |
| 2020/0076355 A1* | 3/2020 | Hudson | F24S 25/70 |
| 2020/0116394 A1* | 4/2020 | West | F24S 25/13 |
| 2020/0256586 A1* | 8/2020 | West | F24S 25/13 |
| 2021/0002896 A1* | 1/2021 | Almy | E02D 27/50 |
| 2021/0384864 A1* | 12/2021 | Wang | F24S 25/70 |
| 2022/0325919 A1* | 10/2022 | Lopez | F24S 30/425 |

* cited by examiner

ADJUSTABLE BEARING SUPPORTS FOR SINGLE-AXIS TRACKERS

CROSS-REFERENCE TO RELATED APPLICATIONS

This is a continuation of U.S. patent application Ser. No. 17/084,355 filed on Oct. 29, 2020, titled "Adjustable Bearing Supports for Single-axis Trackers," which claims priority to U.S. provisional patent application no.: 63/094,577 filed on Oct. 21, 2020, titled "Adjustable truss cap for bearing housing assembly," and 62/927,515 filed on Oct. 29, 2019, titled "Bearing support for single-axis tracker," the disclosures of which are all hereby incorporated by reference in their entirety.

BACKGROUND

Single-axis tracker are becoming for the form factor of choice for utility-scale solar power plants. These arrays consist of rotating rows of solar panels oriented along a North-South line that move from an East-facing to West-facing orientation each day to follow the sun's path through the Southern sky. Until recently, single-axis trackers were constructed on plumb-driven monopile foundations. These foundations consist of rows of so-called "H-piles" are driven into the ground at each desired foundation point. Tracker system hardware is (e.g., bearing assemblies, motors, dampers, etc.) is attached to the top end of each driven pile. One reason for H-pile dominance is simplicity of installation. The piles are one-piece structures that are beaten into the ground with a vibratory or percussive pile driver and provide a uniform interface for tracker makers to design around.

Although all single-axis trackers share common features, there are differences in the design from company to company. In most tracker systems, a bearing is attached to the top of each pile and the torque tube is inserted in the bearing to rotate about its own axis. A motor on each row, or a row-to-row mechanical linkage, is used to rotate the entire torque tube at once so that the attached solar panels remain on-sun throughout each day. Some trackers, however, such as the NX Horizon Series of single-axis trackers from NEXTracker Inc. of Freemont California employ a different design designated as "mechanically balanced". In this type of tracker, the torque tube swings like a pendulum from a bearing pin at the cusp of a cardioid or upside-down U-shaped bearing housing assembly or BHA. The tracker's drive motor is offset from the axis of the torque tube to match the axis of the bearing pins and the torque tube swings through an arc rather than rotating about its own axis. The rotational axis of this tracker is the bearing pin rather the torque tube. The purported advantage of this geometry relative to conventional single-axis trackers where the torque tube rotates about its own axis is that there is no overturning moment, regardless of tilt angle. However, because the top of the bearing housing assembly protrudes up into the module plane, it is necessary to have leave a gap between modules at each foundation point to prevent mechanical interference between the BHA and the modules. As a result, this particular tracker, and others like it, have very little tolerance for position error in the X-direction, that is, the North-South line of the torque tube.

An example of such a mechanically balanced tracker system is shown in FIGS. 6B and 6B. System 10 includes bearing housing assembly or BHA 20 that sits on right angle brackets 30. As seen in FIGS. 6A and 6B, bearing housing assembly (BHA) 20 provides a bearing 21 that supports bearing pin 22. A pair of torque tube photovoltaic module brackets 25 are attached on either side of BHA 20 and receive bearing pin 22 and also support torque tube 27. For ease of illustration, only the back bracket 25 is shown in 6A. The upside-down U-shape of BHA 20 limits the extent of the arc torque tube 27 can swing through. Due to BHA 20 needing to accommodate the swing of the torque tube, the foundation must be wider than the width of conventional H-pile 5. The width of these beams is dictated by the web dimension; six inches is common (e.g., W6×9, W6×12, etc.). As a result, NEXTracker uses a pair of right-angle brackets 30 attached to the outer face of each beam flange to extend the width of H-pile 5 and to provide an adjustable planar base for BHA 20 to sit on. Bolts, hucks or other fasteners 23 extend from BHA 20 into right angle brackets 30 to hold BHA 20 in place.

Another potential advantage of the NEXTracker system is that because the torque tube is not locked in a bearing but rather free to swing, foundations do not always have to be perpendicular to the torque tube. This may be beneficial when installing a tracker on terrain that is not flat. In such situations, NEXTracker's BHA and the hardware supporting it may be adjusted in pitch to take up any mismatch between the torque tube and non-perpendicular foundations. With H-pile foundations, both X-axis and pitch adjustment relative to the foundation are accommodated by simply sliding and or rotating NEXTracker's right-angle brackets relative to the pile.

The applicant of this disclosure has proposed an alternative to H-pile foundations that converts lateral loads primarily into axial forces of tension and compression, allowing single-axis trackers to be supported with relatively less steel. Known commercially as EARTH TRUSS, this foundation system consists of a pair of angled legs extending below and above ground and straddling an intended North-South row of the tracker. The above ground ends of each adjacent leg pair are joined with an adapter or so-called truss cap that has connecting portions received in the open end of each leg and a horizontal mounting platform to support the NEXTracker BHA. The various embodiments of this disclosure are directed to adapters used to join the truss legs and support a mechanically balanced tracker such as that shown in FIG. 6A, or other tracker system requiring a wider support platform than that provided by a standard W6×9 or W6×12 H-pile.

The standard truss cap used in the EARTH TRUSS system is a one-piece casting. When paired with a NEXTracker foundation, some X-axis adjustability may be provided by slots in the top surface of the truss cap, however, because EARTH TRUSS foundations are typically installed to be perpendicular to the torque tube, the one-piece design by itself does not permit pitch adjustment. In recognition of this problem, various embodiments of the invention provide a two-piece truss cap that enable X-axis alone or X-axis and pitch adjustment when supporting a single-axis tracker such as the NX Horizon tracker or other trackers with similar geometry.

DETAILED DESCRIPTION

The following description is intended to convey a thorough understanding of the embodiments described by providing a number of specific embodiments and details involving adjustable bearing supports and bearing assemblies for single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

Figure 1:
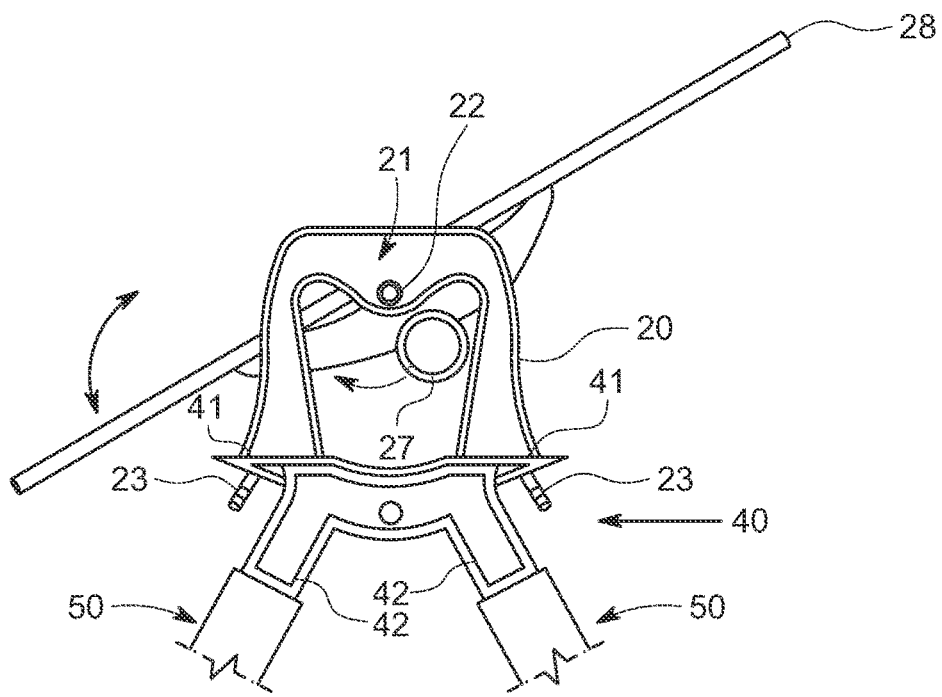
FIG. 1 is a front view of a single-axis tracker bearing housing assembly supported by a truss foundation according to various embodiments.
Figure 2:
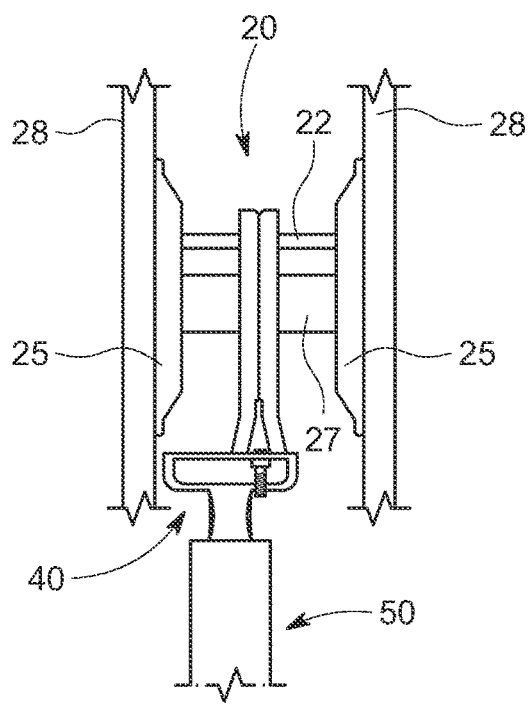
FIG. 2 is a side view of the single-axis tracker bearing housing assembly and truss foundation of FIG. 1.

With reference to FIGS. 1 and 2, these figures show a portion of a single-axis tracker system including a bearing support or truss cap 40 according to various embodiments of the invention. The bearing support or truss cap has a pair of opposing wing portions 41 that extend outward to each side and a pair of connecting portions 42 below that extend below at an angle to join the above ground ends of a pair of adjacent truss legs 50. Though only a portion of each leg 50 is shown in the figure, it should be appreciated that legs 50 extend down below ground level. Each leg 50 may be made from a single structural member or from two or more components connected to each other to form a unitary leg structure as shown, for example, in the context of FIG. 7B. When supporting a single axis tracker, the legs of such a foundation system will typically straddle an intended North-South oriented rotational axis of the tracker. Once the legs are joined to the connecting portions of truss cap or adapter 40, they may be crimped or otherwise attached to form a rigid A-frame-shaped truss foundation. In various embodiments, one of these foundations will be installed at each required location along the torque tube where an H-pile would ordinarily be installed.

Figure 6A:
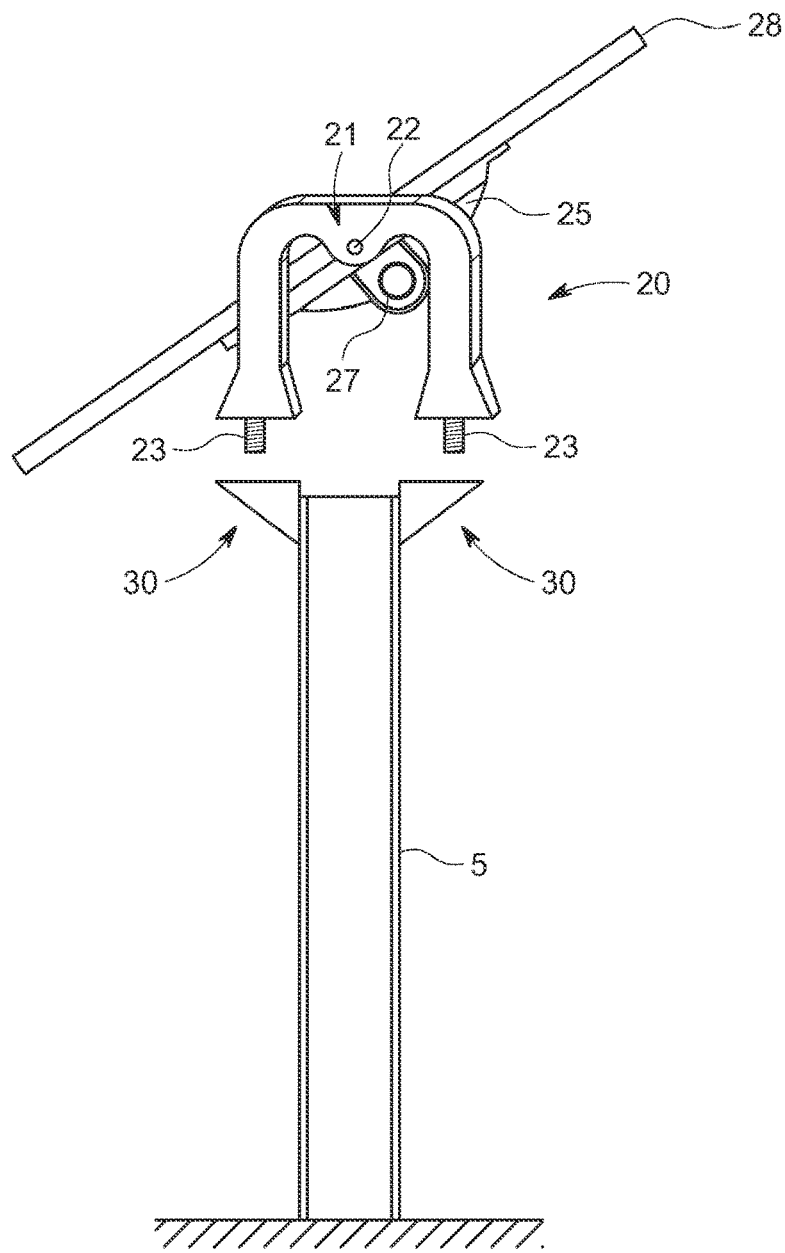
FIGS. 6A and 6B show a single-axis tracker bearing housing assembly supported by a conventional H-pile foundation.
Figure 6B:
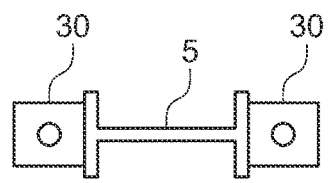

In the system of FIG. 1, truss cap 40 is supporting bearing housing assembly 20 of a mechanically balanced single-axis tracker, such as the NX Series of trackers from NEXTracker, Inc. shown and described in the context of in FIG. 6A. In various embodiments, the top surfaces 41 of truss cap 40 may have slots extending in a direction parallel to the bearing pin (i.e., North South or X-direction) to allow some degree of adjustment along the direction of the torque tube. This is seen, for example, in FIG. 2, where BHA 20 has been adjusted South (to the right) on the top of truss cap 40. This is necessary because legs 50 of the truss foundation were driven too far North from their intended location. To compensate, BHA 20 is slid Southward along the X-axis on surfaces 41 to move it closer to the target position, away from the Northern torque tube module bracket 25 (i.e., the left one in the figure). The positions of torque tube module brackets 25 are dictated by the photovoltaic module dimensions and are typically not variable. In fact, the torque tube may have pre-drilled holes dictating where these component are attached. Therefore, adjustment must be made by moving bearing housing assembly 20 between adjacent torque tube module brackets 25. As a result, it is possible that as the tracker rotates to its steepest angle (60-degrees+), or when wind causes the tracker to flex rotationally, the edge of truss cap 40 may interfere with the frame of closest PV module 28 or with torque tube module bracket 25. To avoid this, the extent of X-direction adjustment may have to be unduly limited with this type of truss cap.

In order to address this potential problem, the Applicant of this disclosure has developed a two-piece truss cap or adapter that provides X-axis adjustability while avoiding mechanical interference with rotating tracker components. This system, designated as system 60, is shown in at least one exemplary embodiment in FIGS. 3A and 3B. The first component is lower truss cap portion 61. Lower truss cap portion 61, like truss cap 40 in FIGS. 1 and 2, includes opposing connecting portions 62 that project away from the main body of lower truss cap portion 61 to join adjacent truss legs 50. In various embodiments, connecting portions 62 are inserted into the open end of each leg 50 and are crimped or otherwise locked into place. In other embodiments, legs 50 may be received in an opening formed in the connecting portions. Connecting portions 62 may have one or more recesses or channels circumscribing their outer surface that creates voids behind the leg for the leg to deform into during crimping. Above the main body of lower truss cap portion 61 is planar mounting surface 63. As shown, this surface has a pair of parallel slots 64 passing through it that run orthogonally to a plane passing through each connecting portion. That is, a line through the center of each connecting portion 50 would be orthogonal to the direction of slots 64 formed in planar mounting surface 63. It should be appreciated that although two slots are shown in the Figure, various embodiments, may only use a single slot. Also, slots 64 may actually be T-shaped to allow a T bolt to slide in and project upward and then be moved along slot 64 to the desired location. When the lower truss cap portion 61 is installed as part of a truss foundations, these slots will be oriented along the X-axis or North-South axis of the tracker.

The second part of two-piece truss cap assembly 60 shown in these figures is the upper bearing housing assembly support 65. Upper BHA support 65 consists of an elongated tray-like structure that made of flat metal base 66 with two upward facing flanges on either side. Base 66 has a pair of opposing openings 68 to receive bolts or other fasteners extending out of the bottom of the bearing housing assembly. In various embodiments, these are proximate to each end, where the legs or feet of the BHA will contact upper BHA support 65. Also, as shown, there are a pair of holes or small slots 67 running lengthwise at the approximate middle of upper BHA support 65. As discussed in the context of the lower truss cap portion 61, in various embodiments, slots 67 may be replaced with a single slot. A pair of fasteners, such as bolts 69 shown in 3A, may be inserted into respective ones of slots 67 in upper BHA support 65 and through slots 64 in the lower truss cap 61, enabling upper BHA support 65, and by extension the BHA, to be moved laterally along the X-axis (the direction of the tracker row and torque tube). Because planar mounting surface 63 of the lower truss cap portion 61 is substantially less wide than the upper BHA support 65, as upper BHA support is moved via overlapping slots 64, 67, there is no remaining structure remaining in the way to mechanically interfere with rotating components of the tracker (e.g., PV modules, PV module mounting brackets, etc.). In this example, the width of planar mounting surface 63 of the lower support portion is approximately 200 mm wide while the upper support portion is approximately 300 mm long. With this geometry, or an even greater differential, as the upper support is moved along the North-South line (see 3B), there is no longer mechanical interference between the torque tube module bracket and/or PV modules at the truss cap because mounting surface 63 of lower truss cap portion 61 does not extend under the distal ends of upper BHA support 65.

Figure 3A:
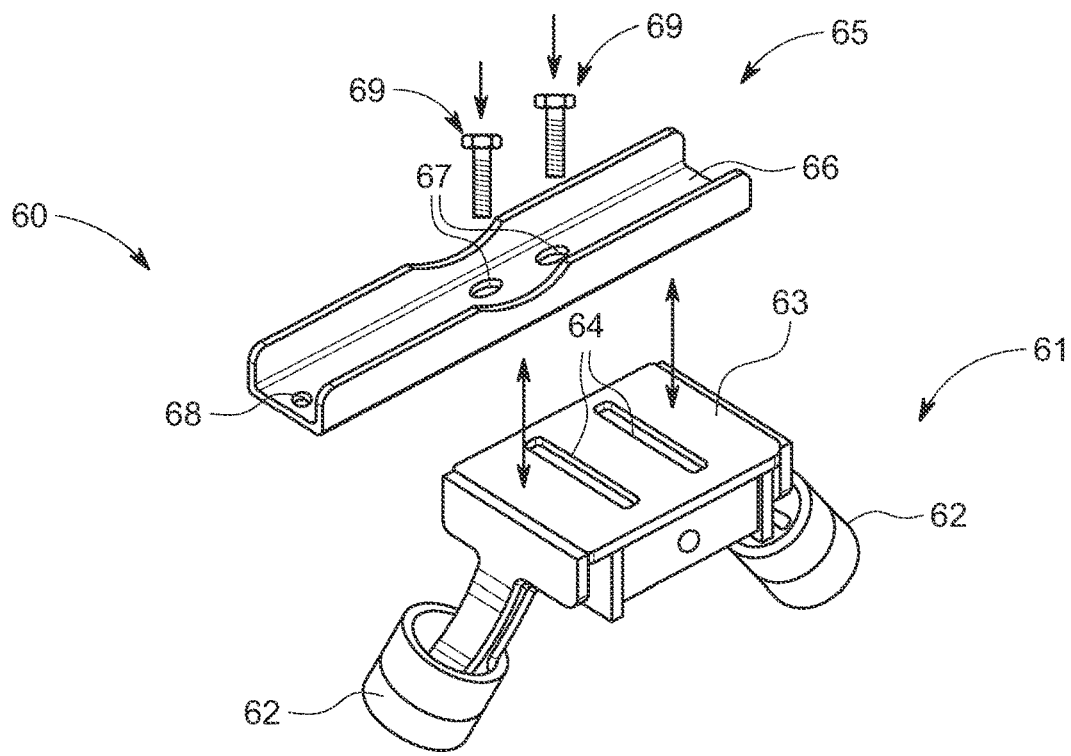
FIG. 3A is a partially exploded view of two-piece truss cap assembly according to various embodiments.
Figure 3B:
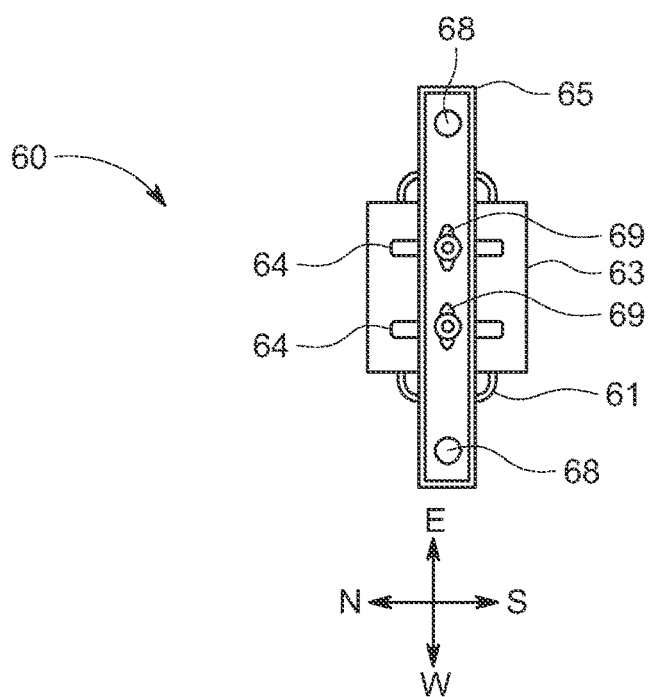
FIG. 3B is a top view of the two-piece truss cap assembly shown in FIG. 3A.
Figure 4:
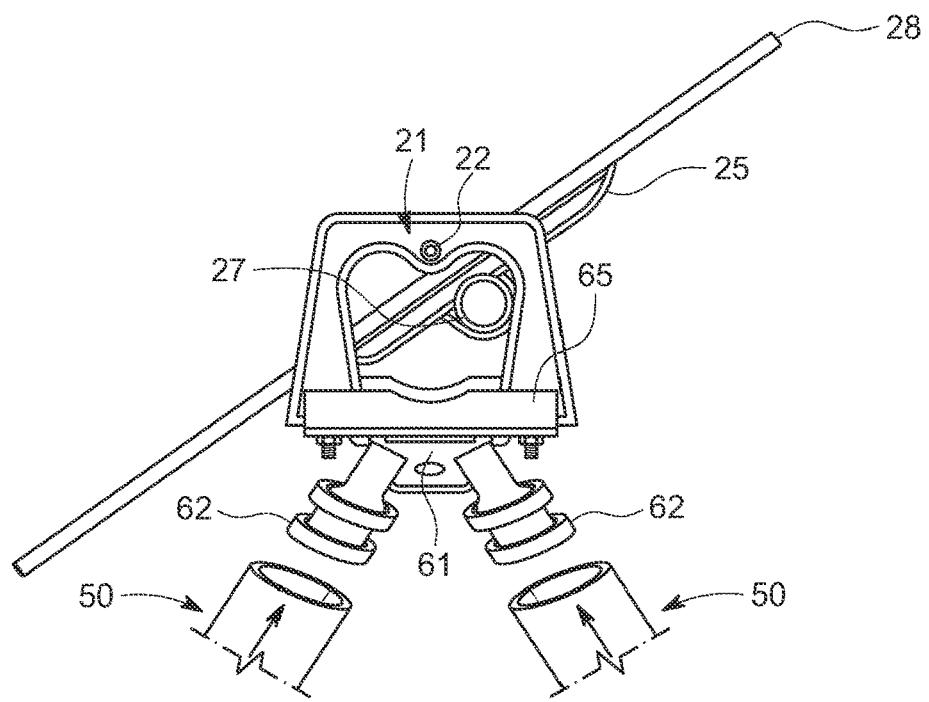
FIG. 4 is a front view of the two-piece truss cap assembly of FIGS. 3A and 3B supporting a bearing housing assembly of a single-axis tracker in accordance with various embodiments.

FIG. 4 shows the two-piece bearing support system of FIGS. 3A and B supporting components of a mechanically balanced single-axis tracker in accordance with various embodiments of the invention. As with the tracker shown in FIG. 1, the single-axis tracker being supported in FIG. 4 is a mechanically balanced NX Series of tracker from NEXTracker, Inc. or like system. It consists of BHA 20 with bearing 21 and bearing pin 22. A torque tube support bracket and/or module bracket 25 support PV module 28 and torque tube 27. These tracker components are supported by upper BHA support 65 which in turn is connected to lower truss cap 61. Although legs 50 are shown away from connecting portions 62 of lower truss cap 61, in practice connections between legs 50 and connecting portions 62 are made prior to attaching tracker components. The foundation in this Figure is an exemplary EARTH TRUSS foundation with a pair adjacent legs 50 joined together with a lower truss cap portion 61 such as that shown in FIGS. 3A/B. An upper BHA support 65 is rigidly attached to the NEXTracker BHA 20. Torque tube 27 is suspended from bearing pin 22 seated in bearing 21 formed in BHA 20. Bearing pin 22 supports a pair of torque tube module brackets 25 positioned in front of and behind BHA 20. For ease of illustration, the front one has been omitted. BHA 20 is mounted to the upper being support, which, in turn, is attached to the lower bearing support.

Figure 5:
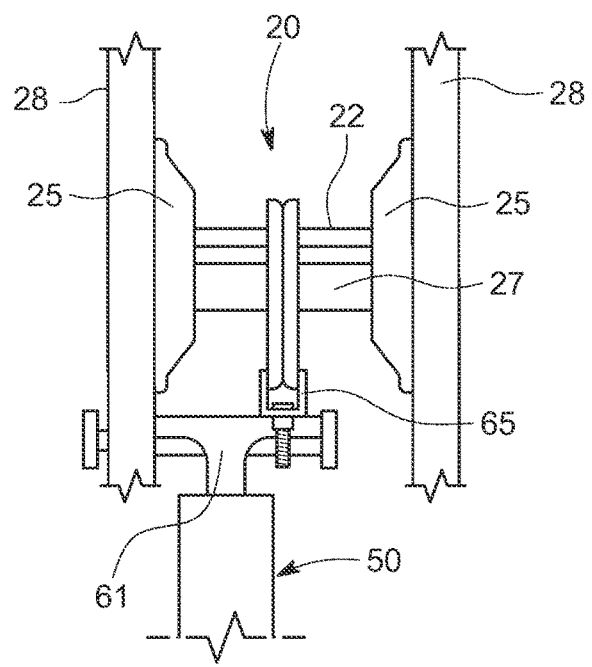
FIG. 5 is a side view of the two-piece truss cap assembly of FIG. 4.

FIG. 5 shows the system of FIG. 4, looking transversely (East) into the BHA from the West. As shown in this example, BHA 20 is formed from press fitting two symmetric pieces together to form a two-sided object. It should be appreciated that BHA 20 may alternatively be cast as a single piece or formed as a weldment made of multiple pieces. In this example, BHA 20 and upper support portion 65 have been moved in the Southernly direction to compensate for misalignment of the foundation with respect to its intended location. However, unlike the truss cap shown in FIG. 1, as BHA 20 and upper BHA support 65 are moved, no interfering material remains below them since they are only supported about the middle of upper BHA support 65. In fact, as shown in 3B, in various embodiments, the width of the planar support portion 63 is ⅔ or less of the length of upper support 65 leaving ⅙ or more cantilevered at each end. This provides sufficient clearance for photovoltaic (PV) modules 28 to rotate through the entire range of tilt angles without mechanical interference while still achieving sufficient support. Mounting surface 63 is narrow enough in the East-West direction so that even when a PV module or torque tube module bracket is directly over it, as may be the case when the BHA 20 and upper BHA support 65 are adjusted to the maximum extent North or South to correct for foundation misalignment, PV module 28 and/or module brackets 25 will not contact the lower truss cap portion 61, even at the maximum tilt angle which is typically limited to 60-65-degrees.

Figure 7A:
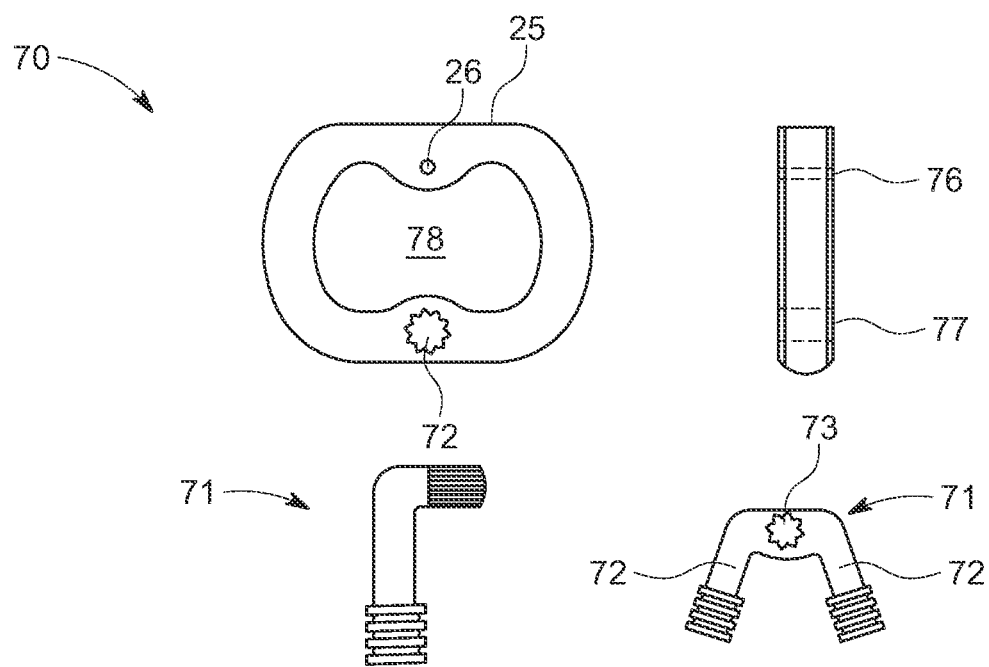
FIG. 7A shows components of an adjustable truss cap and tracker bearing according to various embodiments.
Figure 7B:
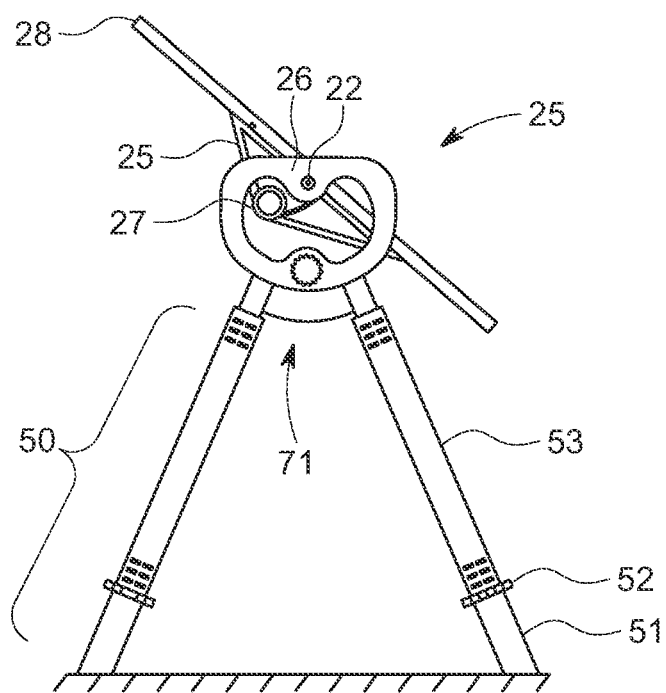
FIG. 7B the adjustable truss cap and bearing of 7A supported by a truss foundation according to various embodiments.

Turning now to FIGS. 7A and 7B, these figures show an adjustable truss cap and bearing assembly 70 for single-axis trackers according to various embodiments. This is meant to replace existing third-party bearing assemblies with a truss optimized one. In this case, truss cap portion 71 includes pair of connecting portions 72 angled to join adjacent truss legs. Splined projection 73 extends in what will be the X or North-South direction when the truss is assembled. BHA 75 includes bearing opening 76 that receives a bearing pin similar to other third-party BHAs shown and described herein. It has a central opening 78 that provides clearance for the torque tube while bounding the extent of its rotation. Splined opening 77 receives splined projection 73. Hammering BHA 75 will cause it slide in the X-direction along splined projection 73 until the correct X-orientation is achieved; a cotter pin, set screw or other structure may be used to hold BHA 75 at the desired orientation. FIG. 7B shows assembly 70 of 7A supported by a truss foundation. In this example, each truss leg 50 consists of screw anchor 51 with driving coupler 52 at its upper end. Upper leg section 53 is sleeved over coupler 52 and over connecting portion 72 of truss cap 71. All points of overlap are crimped to lock the geometry.

FIGS. 8A, 8B, 8C, and 8D show additional truss cap and BHA assemblies according to various embodiments of the invention. Starting with FIG. 8A, the system shown in this figure includes truss cap 81. Truss cap 81 has connecting portions 82 projecting below it. As with other embodiments, these connecting portions 82 are received into the open end of upper leg sections. Truss cap 81 also has planar mounting surface 83. Rather than using an intervening BHA support, such as that shown and discussed in the context of FIGS. 2, 3A and 3B, BHA 85 has a base portion 86 with though holes formed in it, obviating the need for such structure. Slots oriented in the X-direction on planar mounting surface 83 enable BHA 85 to be adjusted in the X-axis (N-S) direction after truss cap 81 has been attached to truss legs. It should be appreciated that shims or other similar structures may also be used between mounting surface 83 and the bottom side of base portion 86 to achieve alignment. For example, shims may provide ½ degree of angular adjustment to correct any misalignment in pitch and roll.

Figure 8A:
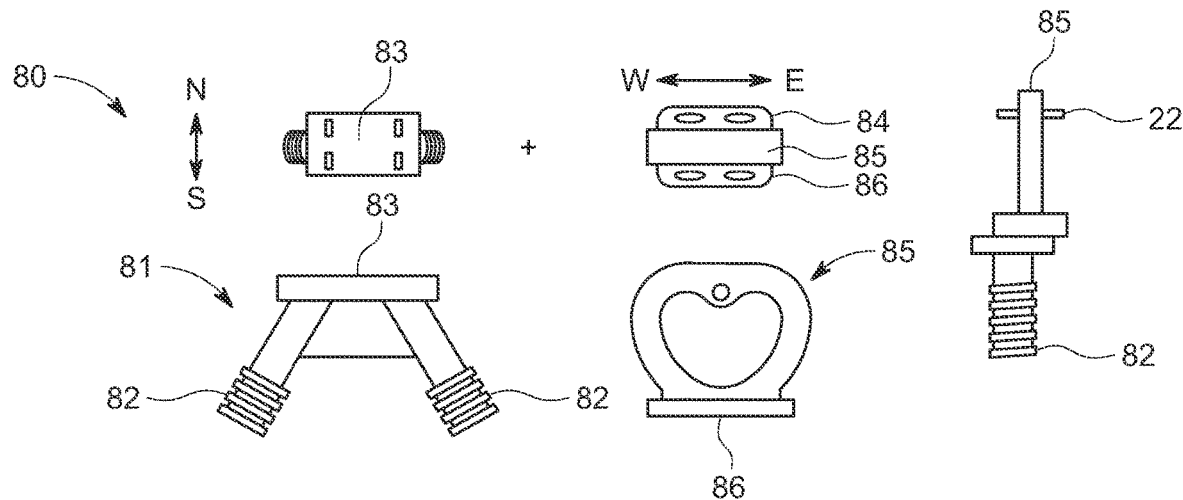
FIG. 8A shows various views of a truss cap and bearing housing assembly according to various embodiments.
Figure 8B:
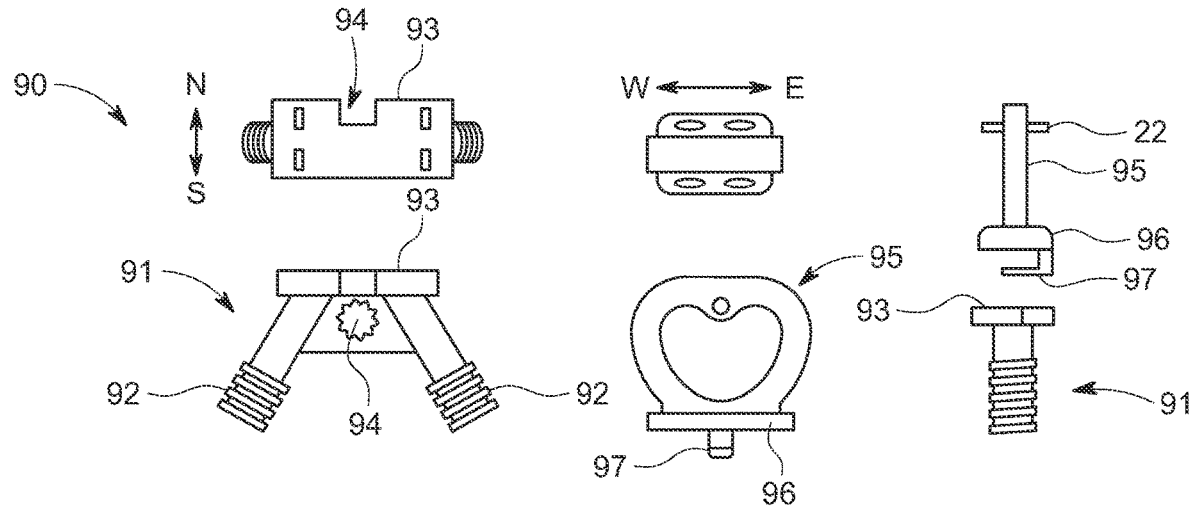
FIG. 8B shows various views of another truss cap and bearing housing assembly according to various embodiments.

FIG. 8B shows another truss cap 91 and BHA 95 assembly. Similar to the assembly shown in 8A, truss cap 91 also includes connecting portions 92 and planar mounting surface 93. In addition, truss cap 91 has notch 94 formed in mounting surface 93. A hooked portion 97 extending below base 96 of BHA 95 slides into notch 94, bearing against the underside of surface 93. This provides additional resistance to bending when the bearing is subjected to axial forces along the axis of the torque tube while still providing adjustability of BHA 95 with respect to truss cap 91 via slots formed in mounting surface 93 and corresponding openings in base 96 of BHA 95.

Figure 8C:
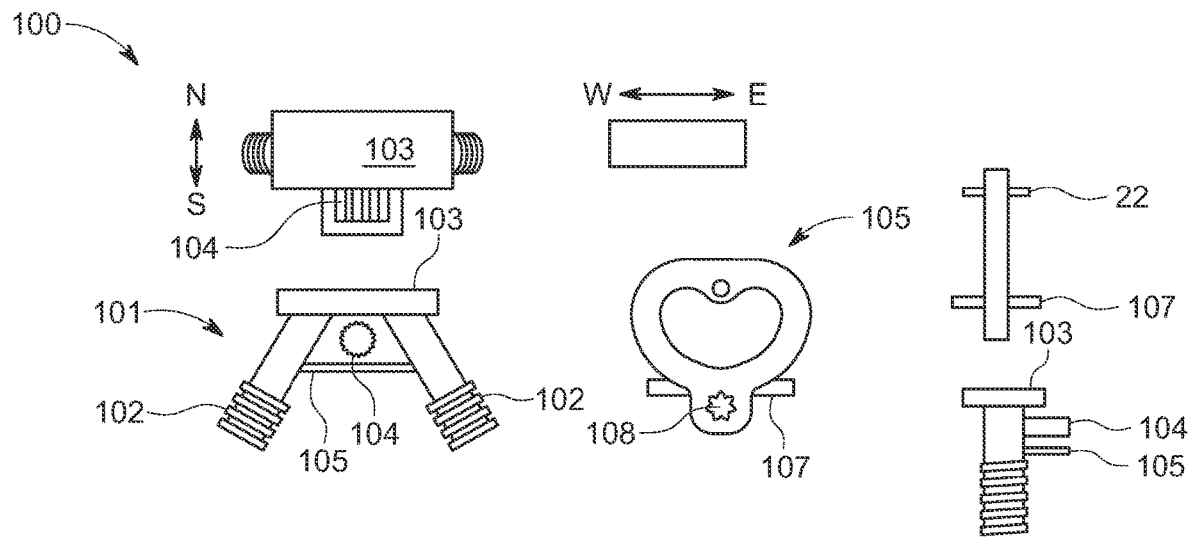
FIG. 8C shows various view of another truss cap and bearing housing assembly according to various embodiments.
Figure 8D:
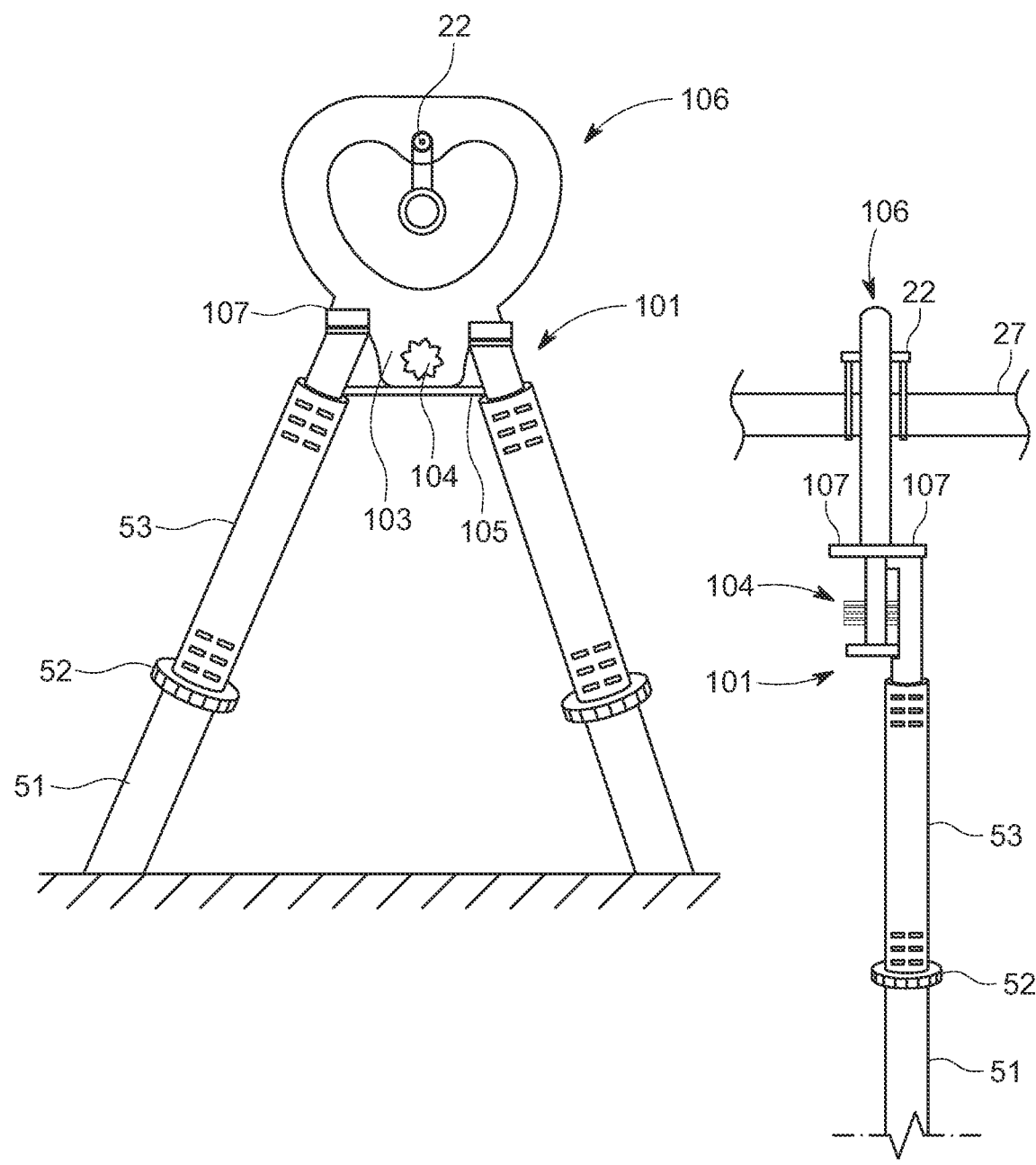
FIG. 8D shows front and side views of the truss cap and bearing housing assembly of FIG. 8C supported by a truss foundation in accordance with various embodiments.

FIGS. 8C and 8D show another truss cap and BHA assembly 100 according to various embodiments of the invention. In this assembly, truss cap 101 has a pair of angled connecting portion 102, planar support surface 103, splined projection 104 and ledge 105. BHA 106 is similar to BHA 75 shown in FIGS. 7A and 7B but in addition to splined opening 108, includes shoulder portions 107 that rest on support surface 103 when BHA 106 is sleeved over splined projection 104. Fitment of BHA 106 and truss cap 101 are shown in greater detail in the front and side views depicted in FIG. 8D.

Figure 9A:
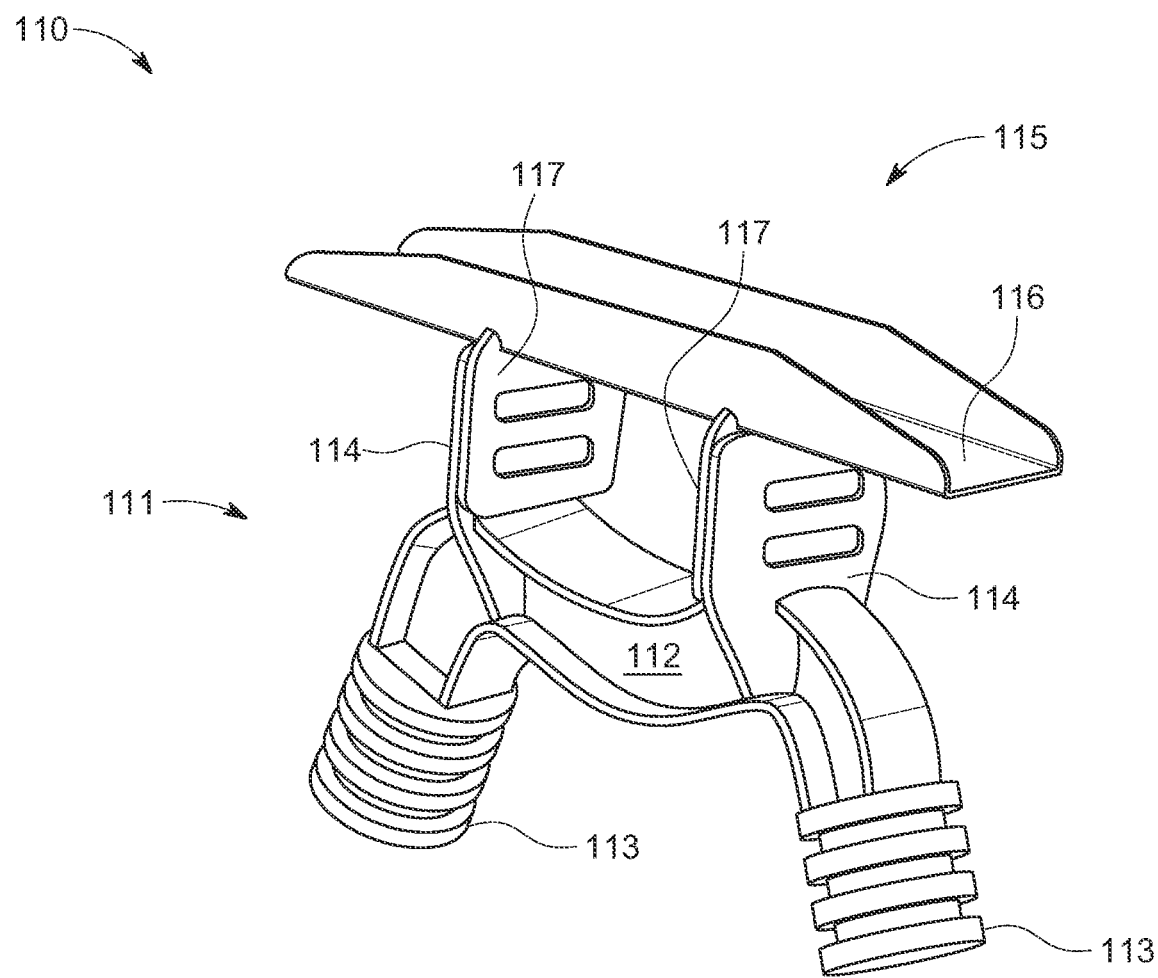
FIGS. 9A-9C show perspective, side, and front views respectively of a two-piece truss cap assembly according to various embodiments.
Figure 9B:
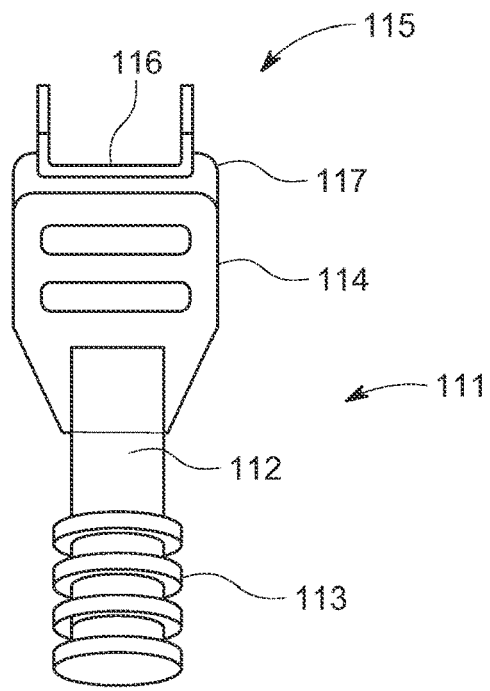
Figure 9C:
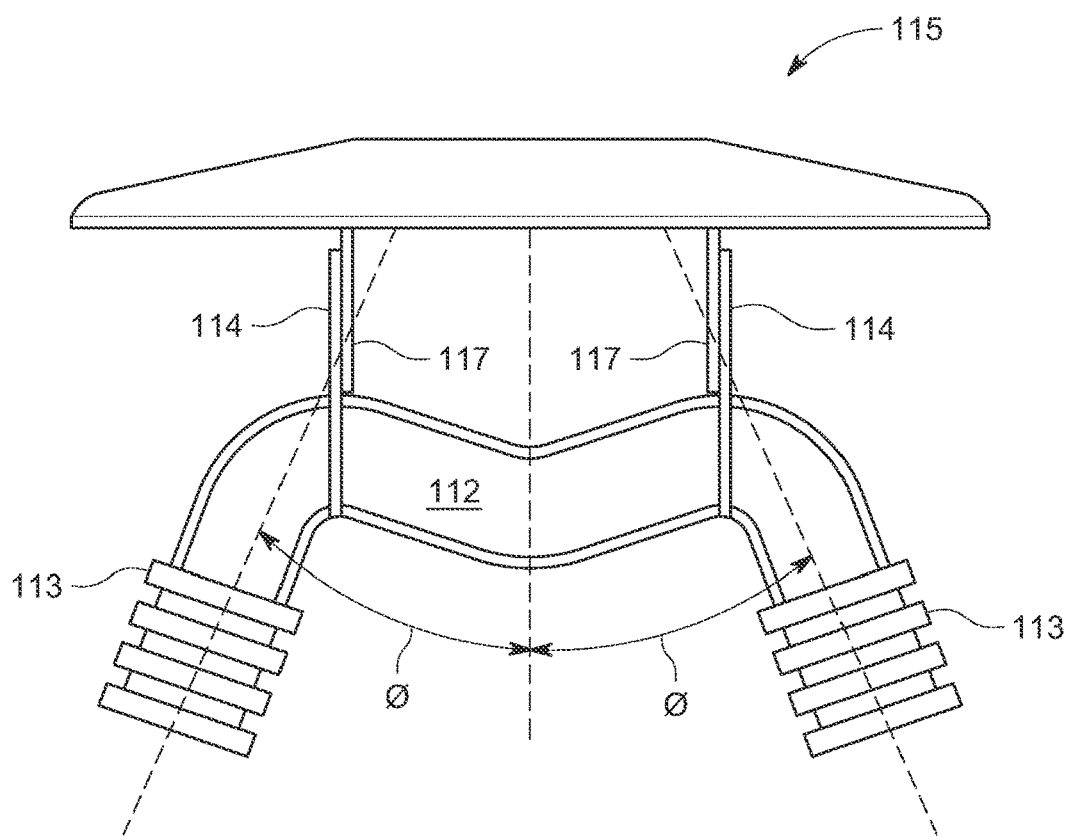
Figure 10:
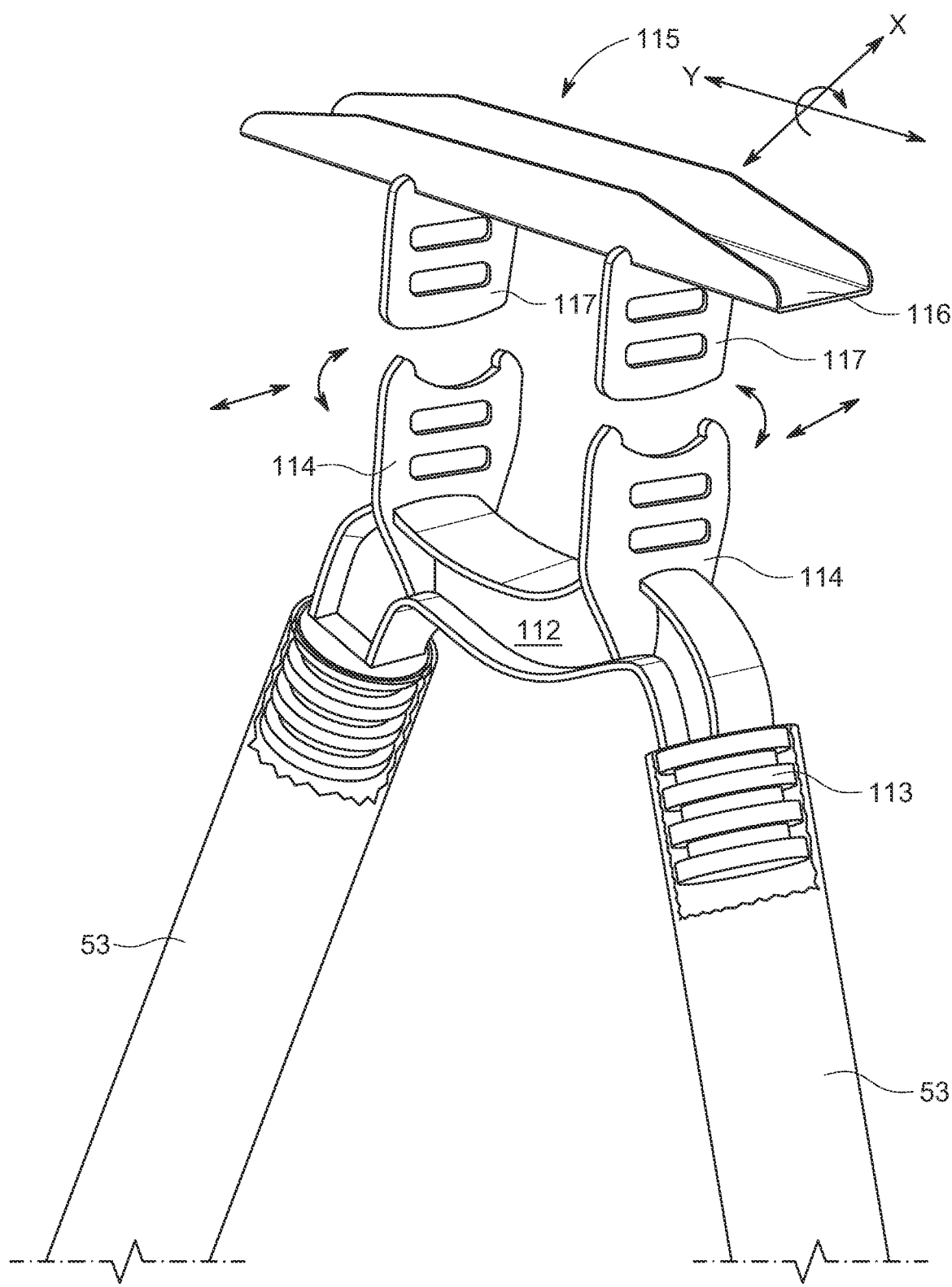
FIG. 10 is a perspective view of the two-piece truss cap assembly of FIGS. 9A-9C supported by a truss foundation in accordance with various embodiments.

Turning now to FIGS. 9A, 9B, and 9C, these figures show different views of a two-piece truss cap assembly 110 according to various other embodiments of the invention. Assembly 110 includes lower truss cap 111 with main body portion 112 and connecting portions 113 extending below and away from main body portion 112 at reciprocal angles 101 with respect to a midline through the main body portion. Unlike other truss caps discussed herein, truss cap 111 has no planar mounting surface. Instead, a pair of opposing flanges 114 extend vertically above main body portion 112. The second portion of assembly 110 is upper BHA support 115 that consists of a tray-like structure with a flat tray-like support surface 116 having a pair of flanges 117 extending vertically below support surface 116. When upper BHA support 115 is positioned above lower truss cap portion 111, flanges 117 of upper BHA support 115 and opposing flanges 114 of the truss cap 111 overlap one another. In some embodiments, upper BHA support flanges 117 may be more narrowly spaced than flanges 114 of lower truss cap 111 so that they fit inside the flanges of the truss cap. In others, they may be spaced wider to fit around them. These are design choices. As seen in the figures, each flange of flanges 114 and flanges 117 have a pair of slots extending along their width. When upper BHA support is installed on lower truss cap 111, these flanges 114, 117 and the corresponding slots will extend along the X-axis of the tracker array, in other words, substantially parallel to the North-South axis of the torque tube. Once the slots are oriented to overlap, bolts or other fasteners may be inserted through each overlapping slot to secure the two components together. During installation of the BHA and torque tube sections, the BHA is secured to upper BHA support 115 and the latter may be rotated and/or slid in the X-direction with respect to lower truss cap portion 111 to enable the BHA to achieve the proper orientation to support the torque tube. It should be appreciated that although slots are shown in both the flanges 117 of upper BHA support 115 and flanges 114 of truss cap 111, one or the other may simply have a hole instead of a slot. The specific geometry of the slots and the type of fasteners used to join them are design choices.

Figure 11:
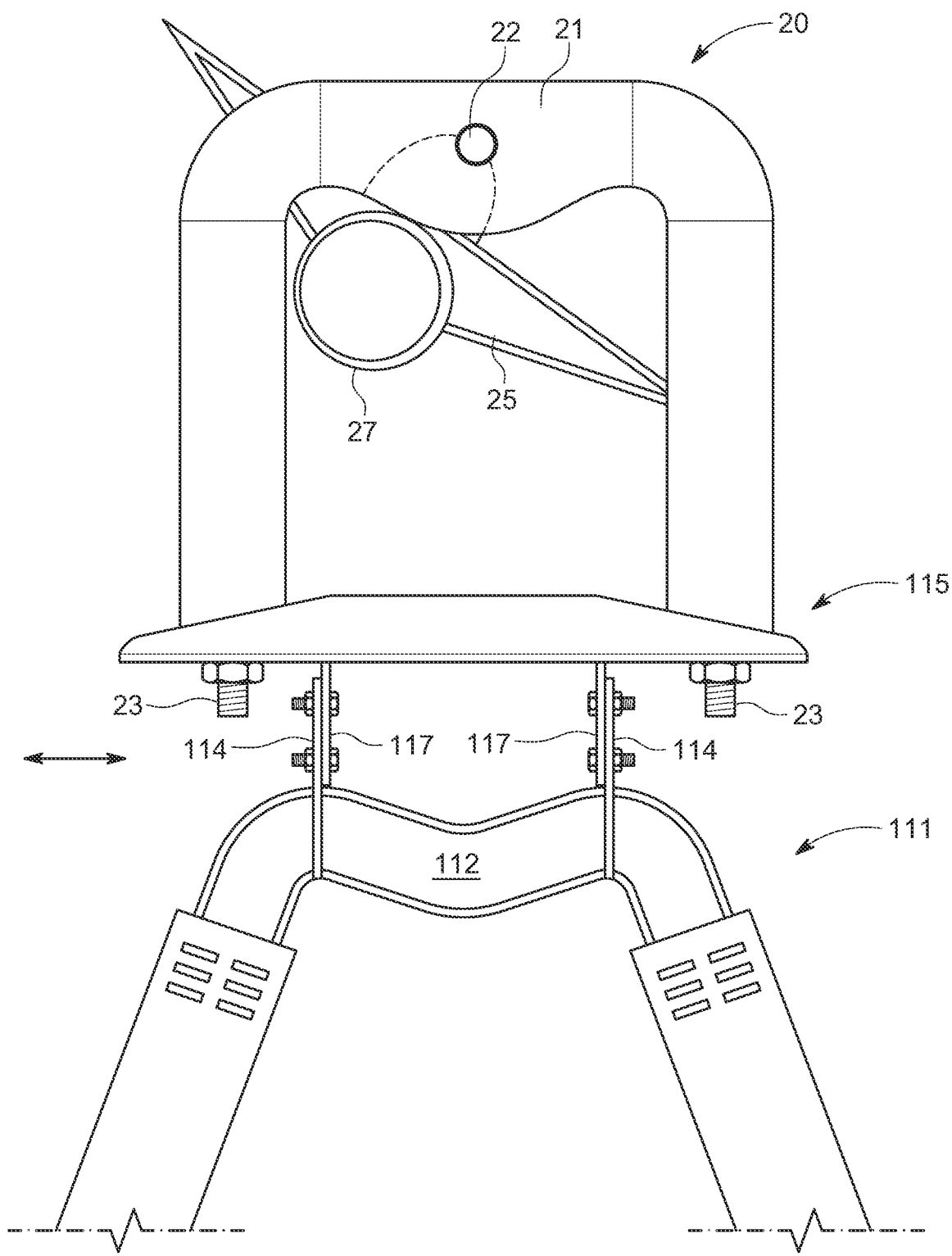
FIG. 11 is a front view of the two-piece truss cap assembly of FIGS. 9A-9C and 10 on a truss foundation and supporting a single-axis tracker bearing housing assembly in accordance with various embodiments.

FIG. 11 shows the NEXTracker BHA 20 sitting on assembly 110 according to various embodiments of the invention. As shown, bolts, hucks or other fasteners 23 may project from the lower end of each leg of BHA 20 through upper BHA support 115 via holes formed in surface 116 of the latter. In the orientation shown in FIG. 11, BHA 20 may be tilted, that is rotated in pitch, into and out of the page about the Y-axis (East-West), via the overlapping connection between flanges 114 of lower truss cap 111 and flanges 117 of upper BHA support 115. BHA 20 may also be slid in the X-direction, that is, into and out of the page, at the same pitch. It should be appreciated that in various embodiments, BHA 20 and upper BHA support 115 may be combined into a single structure to reduce part count. That is, akin to the embodiment shown in FIG. 8A, the features of upper BHA support 115 may be built into an integral base of BHA 20. Such modifications are within the scope and spirit of the invention.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A truss adapter comprising:
 a first, lower portion having a pair of connecting portions for unifying a pair of adjacent truss legs into a truss foundation and a first mating surface above the pair of connecting portions;
 a second, upper portion having a substantially planar bearing support surface and a second mating surface below the substantially planar bearing support surface; and
 at least one fastener passing through respective openings in the first and second mating surfaces, wherein the respective openings partially overlap to enable adjustment of a position of the second, upper portion with respect to the first, lower portion, said position securable with the at least one fastener, wherein the second upper portion comprises an elongated channel member having walls on at least two sides thereof and the elongated channel member has a pair of through-holes proximate to each end for receiving respective fasteners securing a tracker bearing housing to the upper portion.

2. The truss adapter according to claim 1, wherein the at least one fastener passing through respective openings in the first and second mating surfaces is located in between the pair of through-holes.

3. The truss adapter according to claim 1, wherein a width of the first mating surface of the first, lower portion is approximately ⅔ the length of the second, upper portion.

4. An apparatus for forming a truss foundation to support a single-axis tracker, the apparatus comprising:
 a lower adapter portion including a pair of opposing connecting portions for joining a pair of adjacent angled truss legs to form a truss foundation, and a first pair of parallel flanges above the opposing connecting portions; and
 an upper bearing housing assembly support for supporting a bearing housing assembly of a single-axis tracker including a bearing support surface and a second pair of parallel flanges extending towards the first pair of flanges, wherein the first and second pair of parallel flanges overlap one another when the upper bearing housing assembly support is joined to the lower adapter portion, wherein the upper bearing housing assembly support is able to pitch about an axis orthogonal to a main surface of the first and second pair of parallel flanges with respect to the lower adapter portion while openings formed in the first and second pair of parallel flanges remain overlapping.

5. The apparatus according to claim 4, wherein the first and second pairs of flanges each contain overlapping slots.

6. The apparatus according to claim 5, further comprising at least one fastener passing through each pair of overlapping slots to enable the position of the upper bearing housing assembly support to be adjusted relative to the lower adapter portion while remaining attached to it.

7. The system according to claim 5, wherein the upper bearing housing assembly support is able to slide in-plane with respect to the lower adapter portion while the first and second pairs of parallel flanges remain in contact to change a distance between the upper bearing housing assembly support and lower adapter portion.

\* \* \* \* \*